United States Patent
Fan et al.

(10) Patent No.: US 9,330,315 B2
(45) Date of Patent: May 3, 2016

(54) DETERMINING FOREGROUNDNESS OF AN OBJECT IN SURVEILLANCE VIDEO DATA

(75) Inventors: Quanfu Fan, Somerville, MA (US); Sharathchandra U. Pankanti, Darien, CT (US)

(73) Assignee: International Business Machines Corporation, Armonk, NY (US)

( * ) Notice: Subject to any disclaimer, the term of this patent is extended or adjusted under 35 U.S.C. 154(b) by 748 days.

(21) Appl. No.: 13/591,530

(22) Filed: Aug. 22, 2012

(65) Prior Publication Data
US 2014/0055609 A1 Feb. 27, 2014

(51) Int. Cl.
*G06K 9/00* (2006.01)
*G06T 7/00* (2006.01)

(52) U.S. Cl.
CPC .......... *G06K 9/00771* (2013.01); *G06T 7/0081* (2013.01); *G06T 7/0087* (2013.01); *G06T 2207/20144* (2013.01); *G06T 2207/30232* (2013.01)

(58) Field of Classification Search
CPC .............................. H04N 7/181; H04N 5/2226
See application file for complete search history.

(56) References Cited

U.S. PATENT DOCUMENTS

| 8,121,364 | B2 | 2/2012 | Mahesh et al. |
| 8,265,380 | B1 * | 9/2012 | Bvn ........................ H04N 5/272 382/164 |
| 2009/0003725 | A1 | 1/2009 | Merkel et al. |
| 2009/0219379 | A1 * | 9/2009 | Rossato ................ G06T 7/0083 348/14.01 |
| 2009/0244390 | A1 | 10/2009 | Feris et al. |
| 2011/0026853 | A1 | 2/2011 | Gokturk et al. |
| 2011/0052032 | A1 | 3/2011 | Ramsay et al. |
| 2012/0027248 | A1 | 2/2012 | Feris et al. |
| 2012/0051592 | A1 * | 3/2012 | Yashiro ........................ 382/103 |
| 2012/0148094 | A1 * | 6/2012 | Huang ............... G06K 9/00785 382/103 |

OTHER PUBLICATIONS

Alexe, B. et al. "What is an object?". Conference Publication. Conference on Computer Vision and Pattern Recognition (CVPR), 2010 IEEE. pp. 73-80.

Fan, Q. and Pankanti, S. "Modeling of Temporarily Static Objects for Robust Abandoned Object Detection in Urban Surveillance". Conference Publication. 8th IEEE International Conference on Advanced Video and Signal-Based Surveillance, (AVSS) 2011. pp. 36-41.

Fan, Q. and Pankanti, S. "Robust Foreground and Abandonment Analysis for Large-scale Abandoned Object Detection in Complex Surveillance Videos". To be presented at the Sep. 2012 9th IEEE International Conference on Advanced Video and Signal-Based Surveillance.

(Continued)

*Primary Examiner* — Jefferey Harold
*Assistant Examiner* — Justin Sanders
(74) *Attorney, Agent, or Firm* — David Zwick; Matthew Chung

(57) ABSTRACT

A computer identifies a proto-object in a digital image using a background subtraction method, the proto-object being associated with a lighting artifact in the surveillance region. The background subtraction method preserves boundary details and interior texture details of proto-objects associated with lighting artifacts. A plurality of characteristics of the proto-object digital data are determined, the characteristics, individually or in combination, distinguish a proto-object related to a lighting artifact from its background. A learning machine, trained with the plurality of characteristics of proto-objects classified as either foreground or not foreground, determines a likelihood that the plurality of characteristics is associated with a foreground object.

18 Claims, 4 Drawing Sheets

(56) References Cited

OTHER PUBLICATIONS

Ferrando, S. et al. "A New Method for Real Time Abandoned Object Detection and Owner Tracking". Conference Publication. 2006 IEEE International Conference on Image Processing. pp. 3329-3332.

Joachims, T. "Optimizing Search Engines Using Clickthrough Data". Proceedings of the Eighth ACM SIGKDD International Conference on Knowledge Discovery and Data Mining. (KDD) 2002. pp. 133-142. ACM New York, NY.

Liao, H-H. et al. "A Localized Approach to Abandoned Luggage Detection with Foreground-Mask Sampling". Conference Publication. IEEE Fifth International Conference on Advanced Video and Signal Based Surveillance 2008. (AVSS) 2008. pp. 132-139.

Miezianko, R. and Pokrajac, D. "Proceedings of the 6th International Conference on Computer Vision Systems". (ICVS) 2008. pp. 241-250. Berlin, Heidelberg 2008.

Otoom, A. F. et al. "Feature Extraction Techniques for Abandoned Object Classification in Video Surveillance". Conference Publication. 15th IEEE International Conference on Image Processing, 2008. pp. 1368-1371.

Pan, J. et al. "Robust Abandoned Object Dectection Using Region-Level Analysis". Conference Publication. 18th IEEE International Conference on Image Processing (ICIP), 2011. pp. 3597-3600.

Parikh, D. and Grauman, K. "Relative Attributes". Conference Publication. 2011 IEEE International Conference on Computer Vision (ICCV). Conference Publication. 2011. pp. 503-510.

Ridder, C. et al. "Adaptive Background Estimation and Foreground Detection Using Kalman-Filtering". 1995. [online] [retrieved on: May 30, 2012] Retrieved from the internet: URL <http://citeseerx.ist.psu.edu/viewdoc/summary?doi=10.1.1.53.3730>.

"Robust Foreground and Abandonment Analysis for Large-scale Abandoned Object Detection in City Surveillance". Anonymous AVSS Submission for Double Blind Review. (AVSS) 2011.

Stauffer, C. and Grimson, W.E.L. "Adaptive Background Mixture Models for Real-Time Tracking". vol. 2. Conference Publication. IEEE Computer Society Conference on Computer Vision and Pattern Recognition. 1999.

Tian, Y-L. et al. "Real-Time Detection of Abandoned and Removed Objects in Complex Environments". [online] [retrieved on: May 30, 2012] Retrieved from the internet: URL<http://citeseerx.ist.psu.edu/viewdoc/summary?doi=10.1.1.178.5804>.

Tian, Y-L. et al. "Robust Detection of Abandoned and Removed Objects in Complex Surveillance Videos". IEEE Transactions on Systems, Man, and Cybernetics—Part C: Applications and Reviews, vol. 41. No. 5, Sep. 2011. pp. 565-576. Copyright 2010 IEEE.

\* cited by examiner

DETERMINING FOREGROUNDNESS OF AN OBJECT IN SURVEILLANCE VIDEO DATA

FIELD OF THE INVENTION

The present invention relates generally to the field of digital image processing of video surveillance, and more specifically to identifying objects as either foreground or background.

BACKGROUND OF THE INVENTION

Abandoned object detection is one of the most desired video analytics applications for public safety and security. Abandoned objects may contain explosives or other harmful agents. Typically, the application makes an initial determination as to potential abandoned objects and then a human makes the final decision. In urban surveillance at a city level, it is not uncommon to have hundreds of cameras monitoring public places such as streets, roads and buildings. For such large-scale visual analysis by computer, one widely acknowledged issue is the substantial number of false alarms, which can make human adjudication a very daunting task. In realistic environments, many things can be falsely detected as abandoned objects. Among them, lighting artifacts are a dominant source of false positives.

Lighting artifacts, which manifest as brighter or darker areas on surfaces of objects, relative to a "background" image, can be caused by many factors, and can vary during the course of a day, such as due to the transit of the sun across the sky, the transition from night to day, changing from natural lighting to artificial illumination, changes in natural lighting due to changing weather conditions, changes to the reflectivity of surfaces due to rain, turning on or off artificial illumination, and headlights on vehicles, including trains, airplanes, and other mass transit vehicles. In addition, artifacts caused by the transit of the sun can change throughout the year as a result of the precession of the Earth's axis relative to the sun. This movement of the lighting artifacts make them difficult to classify as background objects which are typically fixed in location over a certain period of time. In abandoned object detection applications, lighting artifacts often produce false positives because the artifacts can appear so quickly that the background modeling doesn't have time to adapt to the change in lighting and include the artifact as part of the background.

SUMMARY

Embodiments of the present invention disclose a method, computer program product, and system for identifying a foreground object in a digital image of a surveillance region in which the surveillance region includes one or more lighting artifacts. A computer identifies a proto-object in a digital image using a background subtraction method, the proto-object being associated with a lighting artifact in the surveillance region. The background subtraction method preserves boundary details and interior texture details of proto-objects associated with lighting artifacts. A plurality of characteristics of the proto-object digital data are determined, the characteristics, individually or in combination, distinguish a proto-object related to a lighting artifact from its background. A learning machine, trained with the plurality of characteristics of proto-objects classified as either foreground or not foreground, determines a likelihood that the plurality of characteristics is associated with a foreground object.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "system." Furthermore, aspects of the present invention may take the form of a computer program product embodied in one or more computer-readable storage device(s) having computer readable program code/instructions stored thereon.

The present invention will now be described in detail with reference to the Figures.

Figure 1:
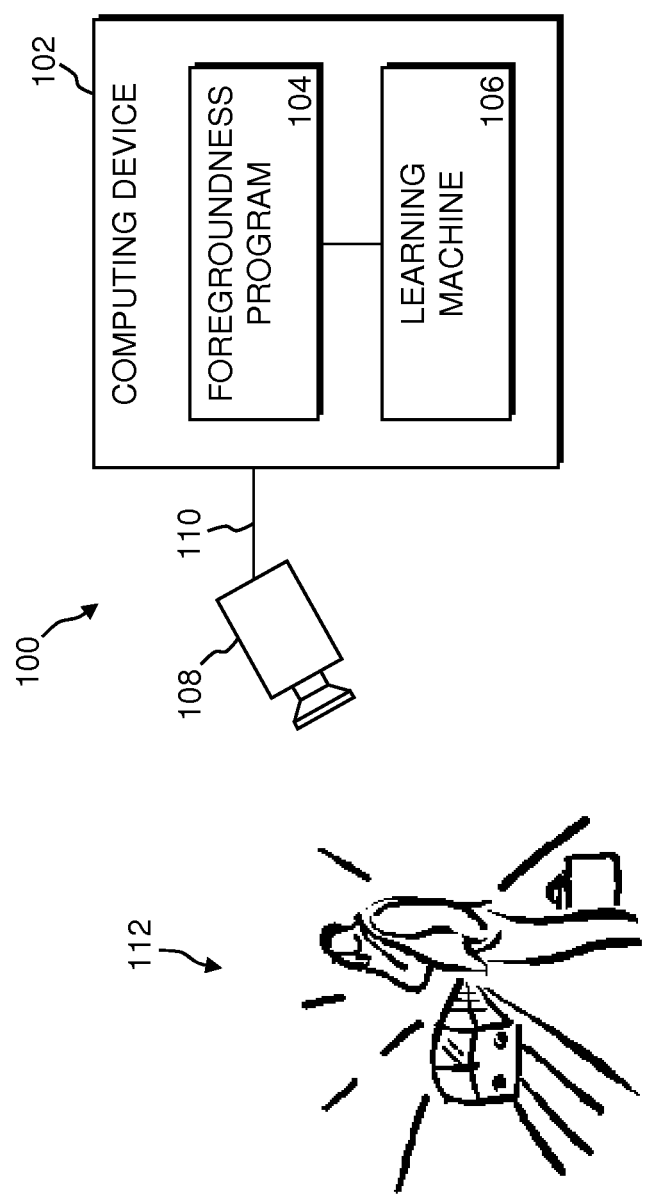
FIG. 1 is a functional block diagram illustrating a foreground object differentiation system, in accordance with an embodiment of the present invention.

FIG. 1 is a functional block diagram illustrating a foreground object differentiation system 100, in accordance with an embodiment of the present invention. Foreground object differentiation system 100 includes computing device 102, digital surveillance camera 108 connected to computing device 102 over a connection 110, and a surveillance region 112 that is surveilled by digital surveillance camera 108.

Surveillance region 112 represents any physical environment of interest of which surveillance is desired, and in which lighting artifacts occur. For example, surveillance region 112 can be located in a transportation hub, such as an airport, a train station, a bus station, or a subway station. Surveillance region 112 could also be located in public or private landmarks, such as government buildings, museums, hotel lobbies, or outdoor locations. In preferred embodiments, surveillance region 112 represents a fixed region in a physical environment that digital surveillance camera 108 can effectively surveil when in a fixed orientation, or when operating in a sweep mode. A physical environment of interest may have many such fixed regions, each surveilled by an associated digital surveillance camera.

The lighting artifacts that occur in surveillance region 112 are brighter or darker areas, relative to a background image, that are formed in surveillance region 112 and appear in digital images of surveillance region 112 that are transmitted by digital surveillance camera 108 to computing device 102. As mentioned above, the lighting artifacts can appear in fixed locations of surveillance region 112, such as a fixed artificial lighting source, or a reflection of the artificial lighting source on, for example, a reflective surface such as a floor. The lighting artifacts can also move in surveillance region 112, such as an area illuminated by sunlight streaming through a window that moves with the transit of the sun, or the headlight on a train pulling into a train station.

Digital surveillance camera 108 represents a standard outdoor or indoor digital surveillance camera capable of surveilling a physical environment, such as surveillance region 112, and transmitting digital information corresponding to images captured while surveilling over connection 110 in a digital protocol to computing device 102. In various embodiments, the transmitted digital information can correspond to, for example, a video stream, a series of images captured at regular intervals, or images captured and transmitted as the result of a triggering event occurring in surveillance region 112, such as detected motion or changes in a visual aspect.

Connection 110 can be, for example, a direct connection, for example, a coaxial or Ethernet cable between digital surveillance camera 108 and computing device 102, or represent an intranet, a local area network (LAN), a wide area network (WAN) such as the Internet, and include wired, wireless, or fiber optic connections. In general, connection 110 can be any combination of connections and protocols that will support communications between computing device 102 and digital surveillance camera 108 over one or more networks that may include one or more private networks as well a public network, such as the Internet, in accordance with an embodiment of the invention.

Computing device 102 may be a laptop computer, tablet computer, netbook computer, personal computer (PC), a desktop computer, or any programmable electronic device capable of communicating with digital surveillance camera 108 via connection 110. Computing device 102 is described in more detail below with respect to FIG. 4.

In a preferred embodiment, computing device 102 includes foregroundness program 104 operating in concert with learning machine 106, the operations of which is explained in more detail below with respect to FIGS. 2 and 3. A learning machine, generally, is a set of programs and mathematical algorithms that is first "trained" by reading training data, typically empirical data, and determines underlying characteristics of interest, such as patterns in the data. Typically, a learning machine will classify the training data into two or more classifications of interest. The training phase often involves human input for certain of the characteristics or classifications. After the learning machine has been trained, the machine can be used to predict the classifications for live data. While those skilled in the art are typically capable of developing their own learning machines, based on various mathematical programming libraries, various proprietary and open source learning machine are readily available. In a preferred embodiment, learning machine 106 is a support vector machine (SVM), for example, libSVM, distributed under a permissive copyright license by C. Hsu et al. In general, learning machine 106 can be any software program or library capable of classification and regression analysis, as required by an embodiment of the invention.

Figure 2:
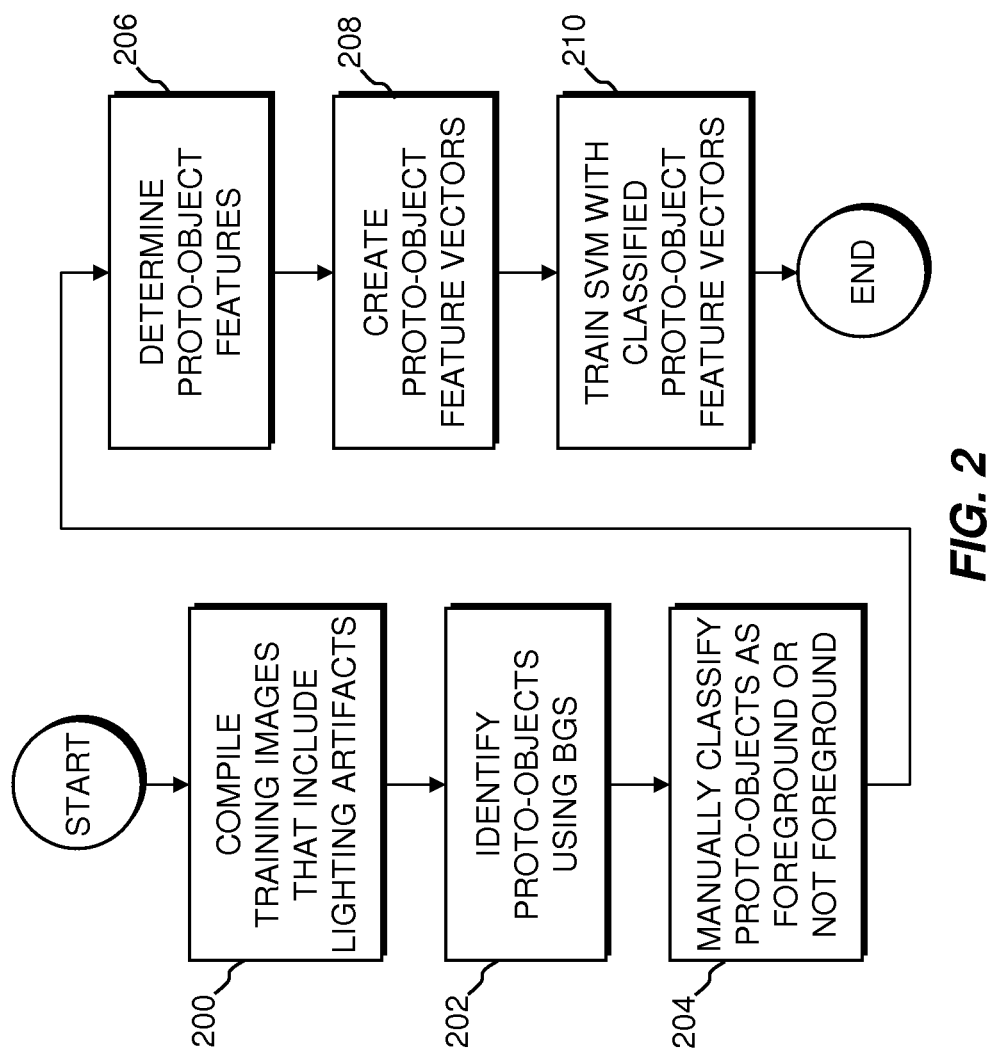
FIG. 2 is a flowchart depicting the steps of training a learning machine on a computing device within the foreground object differentiation system of FIG. 1, in accordance with an embodiment of the present invention.

FIG. 2 is a flowchart depicting the steps of training learning machine 106 on computing device 102, in accordance with an embodiment of the present invention. Training images that include both lighting artifacts and true foreground objects, such as luggage, cars or pedestrians, are chosen from surveillance images of surveillance region 112 taken by digital surveillance camera 108 (step 200). In preferred embodiments, the training images are selected so as to include a wide range of lighting artifacts that occur in surveillance images of surveillance region 112 taken by digital surveillance camera 108.

Proto-objects in the training images are then identified using a background subtraction (BGS) algorithm (step 202). As used herein, a proto-object is any foreground region identified by the BGS algorithm that remains static for a certain period of time in a scene. The BGS algorithm can be any algorithm that will isolate a region of a digital image associated with a lighting artifact. The algorithm also generates one or more background images prior to the occurrence of the lighting artifact. Desirable algorithms will preserve the lighting artifact's boundary details as well as the artifact's interior texture and other characteristics. Such algorithms can include, for example, a median of the previous n frames method, a running average method, a Gaussians Mixture Model method, a kernel density estimators method, a mean-shift based estimation method, a sequential kernel density approximation method, an Eigenbackgrounds method, and algorithms based on one or more of these methods. In a preferred embodiment, a BGS algorithm based on a Gaussian Mixture Model method is used, as described in "Modeling of Temporarily Static Objects for Robust Abandoned Object Detection in Urban Surveillance," Q. Fan and S. Pankanti, 8th IEEE International Conference on Advanced Video Surveillance and Signal-Based Surveillance, 2011, which is hereby incorporated by reference in its entirety.

After proto-objects in the training images have been identified by the BGS algorithm (step 202), the proto-objects are classified as either foreground or not foreground (step 204). In a preferred embodiment, the proto-object classification is performed manually by a human viewing the training images. In the preferred embodiment and other embodiments, the human may be aided by computer programs that can, for example, detect patterns in the surveillance training images. For example, proto-objects that appear in the images with regularity might be pre-classified as not foreground, awaiting confirmation by the human. For example, lighting artifacts corresponding to lamps that turn on at a certain time every day or bright areas caused by the sun that traverse the floor at approximately the same time every day, might be pre-classified as not foreground.

After the proto-objects identified in the training images have been classified as either foreground or not foreground (step 204), certain features of each proto-object are determined (206). The features represent mathematical or logical characteristics of the digital data corresponding to the proto-objects. Desirable features are those that, either individually or in combination, distinguish a proto-object related to a lighting artifact from its background. The features can be derived from, for example, shading and reflection models, image segmentation methods, structural similarity methods, and texture descriptor methods, all as applied to a proto-object. In a preferred embodiment of the invention, a set of complimentary low-level features are determined based on several different techniques. The techniques are directed to the texture differences in the boundary region of the proto-object between the proto-object and the background, edge characteristics of the proto-object, such as edge direction at a particular pixel, and texture and lighting characteristics in the interior of the proto-object. In a preferred embodiment, the features include a region growing feature derived from two segmentation images, one each from either side of the boundary between the proto-object and its background; a regional and a contour similarity matrix derived from a structure similarity method applied at the edges of the proto-object; an illumination model of the proto-object derived from a Phong Shading Model technique applied to the proto-object; and a textural model of the boundary between the proto-object and its background derived from a Local Ternary Patterns technique applied to the proto-object. These and other techniques and methods are described in "Robust Foreground and Abandonment Analysis for Large-Scale Abandoned Object Detection in Complex Surveillance Videos," Q. Fan and S. Pankanti, 2012, which is hereby incorporated by reference in its entirety.

After proto-object features are determined (step 206), proto-object feature vectors are created (step 208). Each vector includes a foreground or not foreground classification, and additional dimensions related to the outputs of the feature techniques. Each dimension of the vector can be a mathematical or logical value, a vector of constants, a matrix, or any other output from a feature technique. The feature vectors are then used to train learning machine 106 (step 210) in classifying proto-objects detected in, for example, live digital images of surveillance region 112 received from digital surveillance camera 108.

Although the steps of training learning machine 106 have been described as occurring in a particular order, those of skill in the art will recognize that the steps may be performed in a different order. For example, proto-objects may be identified, their features determined, and proto-object vectors created before the proto-objects have been classified as either foreground or not foreground.

Figure 3:
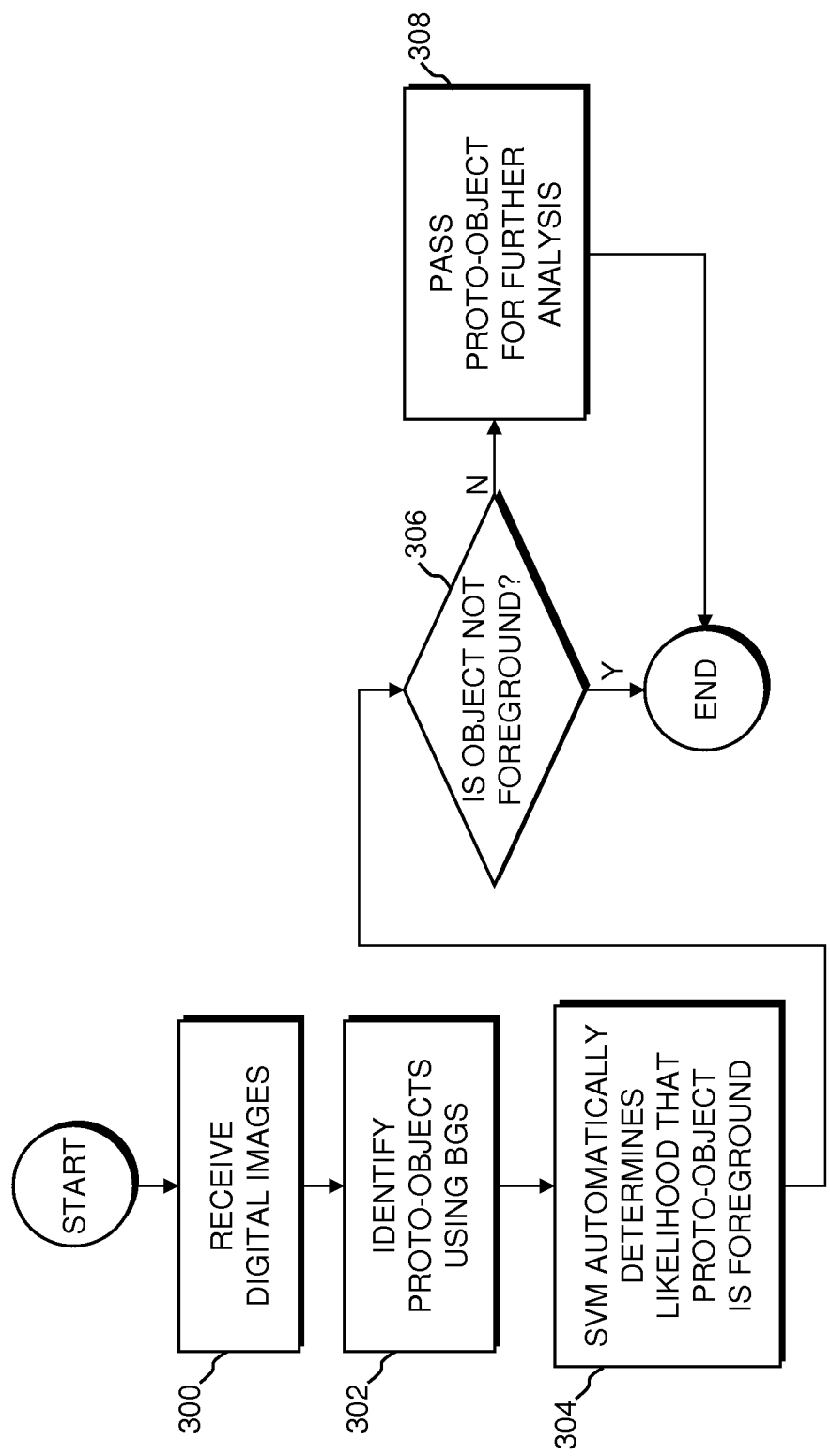
FIG. 3 is a flowchart depicting the steps of the foregroundness program of FIG. 1 in normal operation, in accordance with an embodiment of the present invention.

FIG. 3 is a flowchart depicting the steps of foreground object differentiation system 100 in normal operation, in accordance with an embodiment of the present invention. In normal operation, foregroundness program 104 receives live digital images of surveillance region 112 from digital surveillance camera 108 (step 300). In a preferred embodiment, the images are streamed in real-time to foregroundness program 104. In other embodiments, images can be buffered in intermediate storage, such as tangible storage device(s) 830 or RAM(s) 822 (see FIG. 4). In general, images received by foregroundness program 104 are accepted at a rate consistent with the rate at which foreground object differentiation system 100, and any other follow-on processing, can process them. The rate can be determined by the rate at which digital surveillance camera 108 transmits digital images, or by, for example, a scheme in foregroundness program 104 in which received digital images are accepted by foregroundness program 104 on an as-needed basis.

After digital images have been received and accepted by foregroundness program 104 (step 300), foregroundness program 104 identifies proto-objects in the digital images (step 302) using the same BGS algorithm used during the learning machine 106 training phase, described above. Similar to the training phase, a feature vector is created for each proto-object, using the same features as in the training phase, and the feature vectors are then passed to learning machine 106.

After proto-images have been identified in the received digital images and feature vectors have been created (step 302), foregroundness program 104 passes the feature vectors to learning machine 106. Based on the training data, learning machine 106 automatically determines the likelihood that a feature vector represents a proto-object that is a foreground object (step 304). Typically, the likelihood ranges from a value of 1.00, indicating a certainty that the feature vector corresponds to a foreground object, to a value of 0.00, indicating a certainty that the feature vector corresponds to a background object.

In certain embodiments, feature vectors derived from live digital images may optionally be added to the learning machine 106 training data. For example, if learning machine 106 determines that the likelihood value for a proto-object feature vector is in the first or fourth quartiles, the feature vector can be added to the learning machine 106 training data with a classification of either not foreground or foreground, respectively. The learning machine can be retrained periodically with the enhanced training data.

After the likelihood determination has been made (step 304), a decision is made as to whether the proto-object is considered as not being part of the foreground (decision step 306). If the object is considered as not foreground (decision step 306, "yes" branch), processing for the proto-object ends. If the proto-object is considered as possibly foreground (decision step 306, "no" branch), information relating to the proto-object is passed downstream (step 308) for additional processing, such as, for example, object identification or abandoned object detection analysis. In a preferred embodiment, the decision to pass the proto-object for further analysis (decision step 306, "no" branch) is based on a threshold likelihood value. For example, if learning machine 106 determines that the likelihood value for a feature vector is below a threshold value of 0.33, thus indicating a low likelihood that the associated proto-object is a foreground object, processing for the proto-object ends (decision step 306, "yes" branch). If learning machine 106 determines that the likelihood value for the feature vector is greater than or equal to the threshold value of 0.33, indicating a range of likelihood from an uncertainty as to whether the associated proto-object is a foreground object to certainty that the associated proto-object is a foreground object (decision step 306, "no" branch), information relating to the proto-object is passed downstream (step 308) for additional processing.

As described above, a preferred embodiment of the invention is directed to reducing false positives in identifying lighting artifacts as foreground objects. This is accomplished in part through selection of a combination of a BGS algorithm and object feature methods and techniques that work well in distinguishing a proto-object related to a lighting artifact from its background, as well as identifying distinguishing features of the proto-object related lighting artifact. Those having skill in the art will recognize that alternative embodiments of the invention may be directed to distinguishing other objects and artifacts from their backgrounds. For example, abandoned object detection processing for a particular surveillance region 112 may be experiencing a high false positive rate related to artifacts or objects not related to lighting, for example, piles of leaves in Autumn. An alternative embodiment might include a combination of a BGS algorithm and object feature methods and techniques that work well in distinguishing a proto-object related to a pile of leaves from its background, as well as identifying distinguishing features of the proto-object related pile of leaves.

Figure 4:
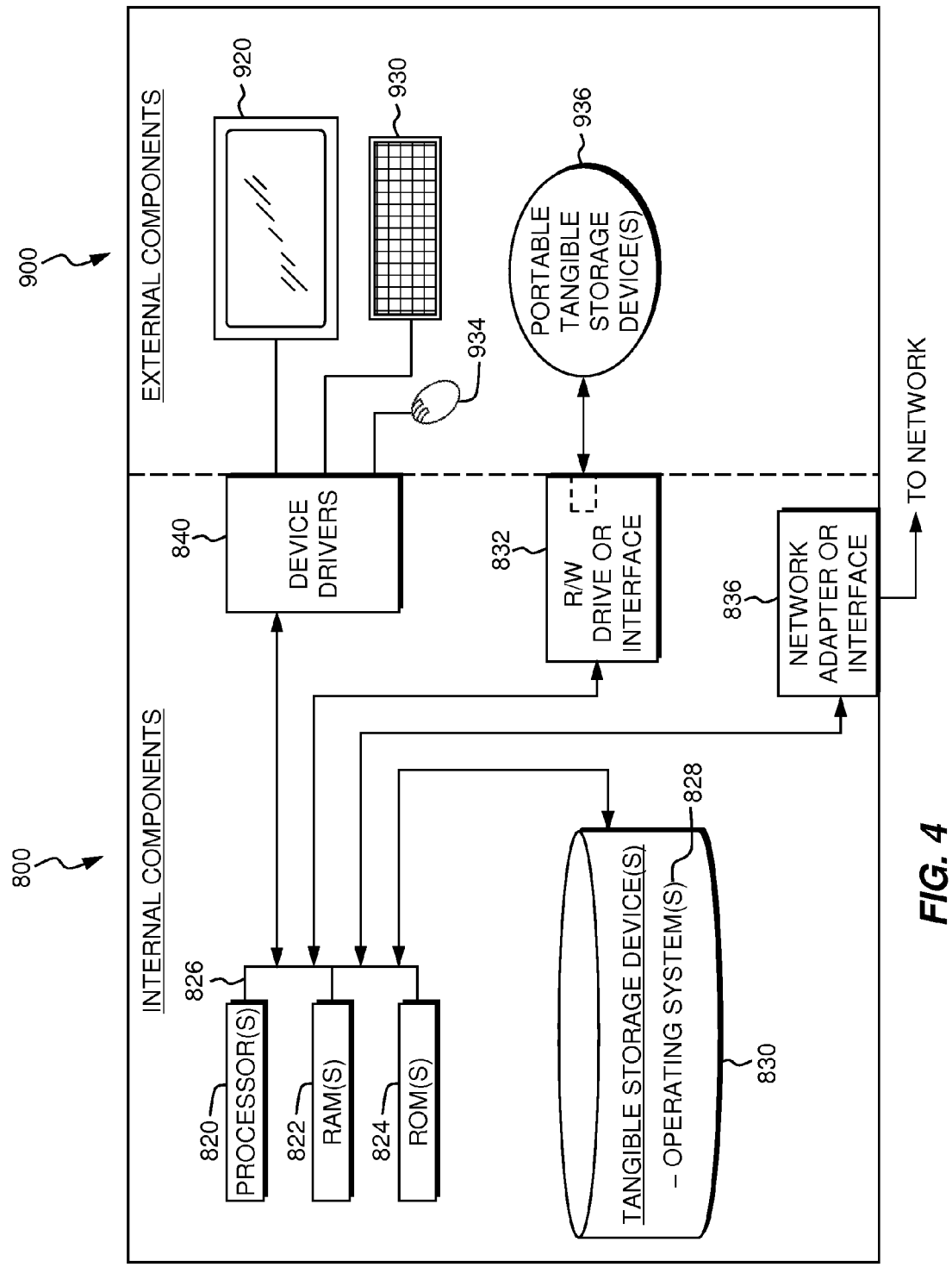
FIG. 4 is a block diagram of components of the computing device of the foreground object differentiation system of FIG. 1, in accordance with an embodiment of the present invention.

Turning now to FIG. 4, computing device 102 includes internal components 800 and external components 900 as illustrated. Internal components 800 includes one or more processors 820, one or more computer-readable RAMs 822 and one or more computer-readable ROMs 824 on one or more buses 826, one or more operating systems 828 and one or more computer-readable tangible storage devices 830. The one or more operating systems 828 and programs 104 and 106 on computing device 102 are stored on one or more of computer-readable tangible storage devices 830 for execution by one or more of processors 820 via one or more of RAMs 822 (which typically include cache memory). In the illustrated embodiment, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. The programs 104 and 106 on computing device 102 can be stored on one or more portable computer-readable tangible storage devices 936, read via the respective R/W drive or interface 832 and loaded into the respective hard drive or computer-readable tangible storage device 830.

Internal components 800 also includes a network adapter or interface 836 such as a TCP/IP adapter card or wireless communication adapter (such as a 4G wireless communication adapter using OFDMA technology). The programs 104 and 106 on computing device 102 can be downloaded to the computing/processing device from an external computer or external storage device via a network (for example, the Internet, a local area network or other, wide area network or wireless network) and network adapter or interface 836. From the network adapter or interface 836, the programs are loaded into the respective hard drive or semiconductor storage device 830. The network may comprise copper wires, optical fibers, wireless transmission, routers, firewalls, switches, gateway computers and/or edge servers.

External components 900 includes a display screen 920, a keyboard or keypad 930, and a computer mouse or touchpad 934. Internal components 800 also includes device drivers 840 to interface to display screen 920 for imaging, to keyboard or keypad 930, to computer mouse or touchpad 940, and/or to display screen for pressure sensing of alphanumeric character entry and user selections. The device drivers 840, R/W drive or interface 832 and network adapter or interface 836 comprise hardware and software (stored in computer-readable tangible storage device 830 and/or ROM 824).

The programs can be written in various programming languages (such as Java, C+) including low-level, high-level, object-oriented or non object-oriented languages. Alternatively, the functions of the programs can be implemented in whole or in part by computer circuits and other hardware (not shown).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Based on the foregoing, a computer system, method and program product have been disclosed for identifying a foreground object in a digital image. However, numerous modifications and substitutions can be made without deviating from the scope of the present invention. Therefore, the present invention has been disclosed by way of example and not limitation.

What is claimed is:

1. A method for identifying a background object in a digital image of a surveillance region, the surveillance region including one or more lighting artifacts, the method comprising:
   receiving training data that includes characteristics of lighting artifacts pre-classified as background objects from digital images of the surveillance region, wherein the lighting artifacts exhibit a pattern in a plurality of the digital images that includes moving in the surveillance region;
   training a learning machine with the training data to determine a likelihood that a lighting artifact from a plurality of digital images is a background object;
   receiving digital images of the surveillance region from a digital surveillance camera;
   identifying a proto-object in a plurality of the received digital images using a background subtraction method, the proto-object being associated with a lighting artifact in the surveillance region, the background subtraction method preserving boundary details and interior texture details of proto-objects associated with lighting artifacts;
   determining a plurality of characteristics of the proto-object digital data, the characteristics, individually or in combination, distinguishing a proto-object related to a lighting artifact from its background; and
   determining by the learning machine a likelihood that the plurality of characteristics is associated with a background object.

2. A method in accordance with claim 1, further comprising, in response to determining that the likelihood is greater than a threshold likelihood value, classifying the proto-object as a background object.

3. A method in accordance with claim 1, wherein the background subtraction method is one of: a median of the previous n frames method, a running average method, a mixture of Gaussians method, a kernel density estimators method, a mean-shift based estimation method, a sequential kernel density approximation method, and an Eigenbackgrounds method.

4. A method in accordance with claim 1, wherein the plurality of characteristics is two or more of: a region growing characteristic, a structure similarity characteristic, a Phong Shading Model characteristic, a local ternary patterns characteristic.

5. A method in accordance with claim 1, wherein the learning machine is a support vector machine.

6. A method in accordance with claim 1, wherein the received digital images correspond to a fixed surveillance region.

7. A computer program product for identifying a background object in a digital image of a surveillance region, the surveillance region including one or more lighting artifacts, the computer program product comprising:
   one or more computer-readable storage media and program instructions stored on the one or more computer-readable storage media, the program instructions comprising:
   program instructions to receive training data that includes characteristics of lighting artifacts pre-classified as background objects from digital images of the surveillance region, wherein the lighting artifacts exhibit a pattern in a plurality of the digital images that includes moving in the surveillance region;
   program instructions to train a learning machine with the training data to determine a likelihood that a lighting artifact from a plurality of digital images is a background object;

program instructions to receive digital images of the surveillance region from a digital surveillance camera;

program instructions to identify a proto-object in a plurality of the received digital images using a background subtraction method, the proto-object being associated with a lighting artifact in the surveillance region, the background subtraction method preserving boundary details and interior texture details of proto-objects associated with lighting artifacts;

program instructions to determine a plurality of characteristics of the proto-object digital data, the characteristics, individually or in combination, distinguishing a proto-object related to a lighting artifact from its background; and program instructions to determine by the learning machine a likelihood that the plurality of characteristics is associated with a background object.

8. A computer program in accordance with claim 7, further comprising, in response to determining that the likelihood is greater than a threshold likelihood value, program instructions to classify the proto-object as a background object.

9. A computer program in accordance with claim 7, wherein the background subtraction method is one of: a median of the previous n frames method, a running average method, a mixture of Gaussians method, a kernel density estimators method, a mean-shift based estimation method, a sequential kernel density approximation method, and an Eigenbackgrounds method.

10. A computer program in accordance with claim 7, wherein the plurality of characteristics is two or more of: a region growing characteristic, a structure similarity characteristic, a Phong Shading Model characteristic, a local ternary patterns characteristic.

11. A computer program in accordance with claim 7, wherein the learning machine is a support vector machine.

12. A computer program in accordance with claim 7, wherein the received digital images correspond to a fixed surveillance region.

13. A computer system for identifying a background object in a digital image of a surveillance region, the surveillance region including one or more lighting artifacts, the computer system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to receive training data that includes characteristics of lighting artifacts pre-classified as background objects from digital images of the surveillance region, wherein the lighting artifacts exhibit a pattern in a plurality of the digital images that includes moving in the surveillance region;

program instructions to train a learning machine with the training data to determine a likelihood that a lighting artifact from a plurality of digital images is a background object;

program instructions to receive digital images of the surveillance region from a digital surveillance camera;

program instructions to identify a proto-object in a plurality of the received digitals image using a background subtraction method, the proto-object being associated with a lighting artifact in the surveillance region, the background subtraction method preserving boundary details and interior texture details of proto-objects associated with lighting artifacts;

program instructions to determine a plurality of characteristics of the proto-object digital data, the characteristics, individually or in combination, distinguishing a proto-object related to a lighting artifact from its background; and program instructions to determine by the learning machine a likelihood that the plurality of characteristics is associated with a background object.

14. A computer system in accordance with claim 13, further comprising, in response to determining that the likelihood is greater than a threshold likelihood value, program instructions to classify the proto-object as a background object.

15. A computer system in accordance with claim 13, wherein the background subtraction method is one of: a median of the previous n frames method, a running average method, a mixture of Gaussians method, a kernel density estimators method, a mean-shift based estimation method, a sequential kernel density approximation method, and an Eigenbackgrounds method.

16. A computer system in accordance with claim 13, wherein the plurality of characteristics is two or more of: a region growing characteristic, a structure similarity characteristic, a Phong Shading Model characteristic, a local ternary patterns characteristic.

17. A computer system in accordance with claim 13, wherein the learning machine is a support vector machine.

18. A computer system in accordance with claim 13, wherein the received digital images correspond to a fixed surveillance region.

* * * * *